(Specimens.)
A. CRUTO.
PROCESS OF MAKING INCANDESCENTS.
No. 302,827. Patented July 29, 1884.
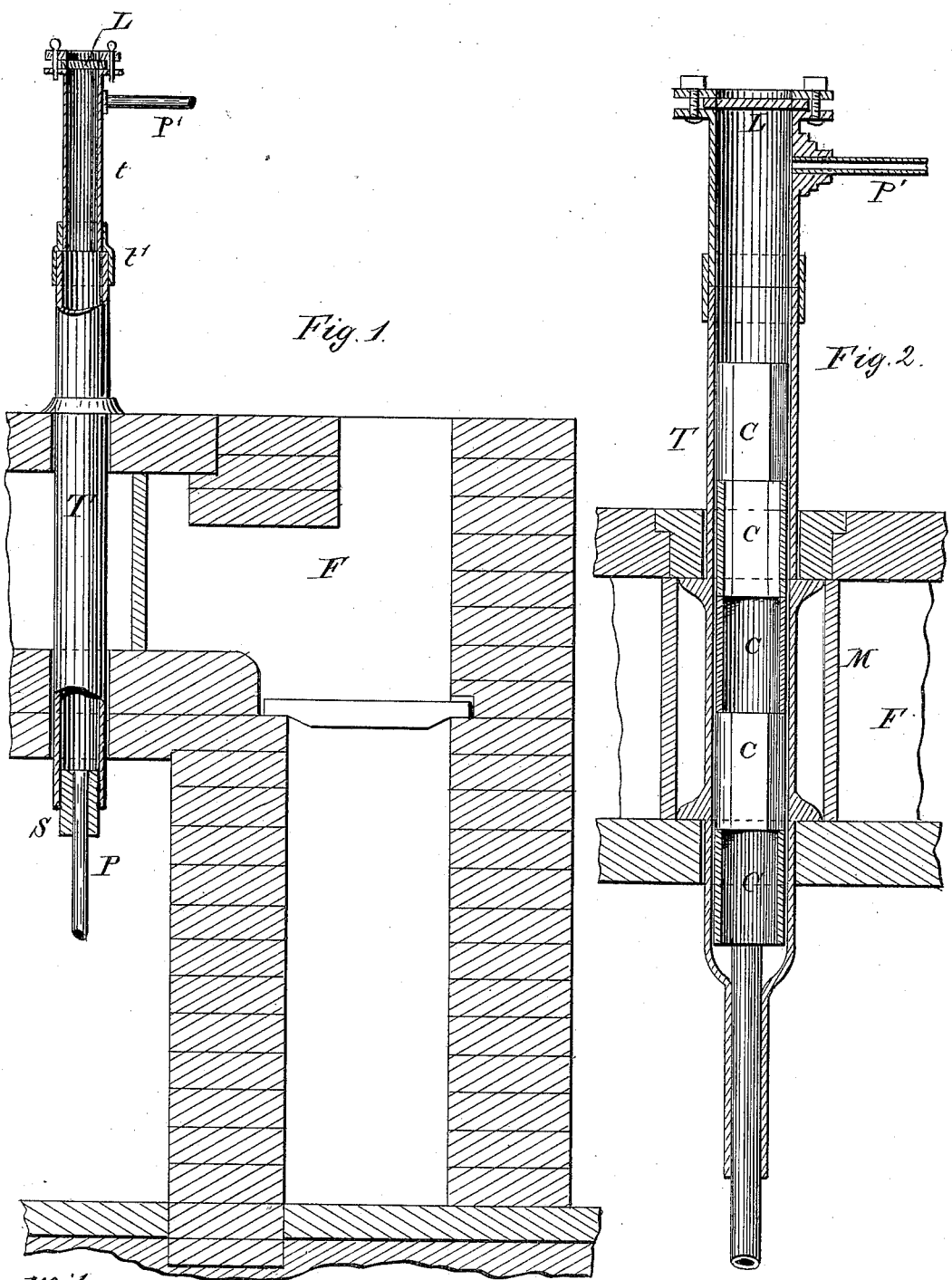

UNITED STATES PATENT OFFICE.

ALESSANDRO CRUTO, OF PIOSSASCO, ITALY.

PROCESS OF MAKING INCANDESCENTS.

SPECIFICATION forming part of Letters Patent No. 302,827, dated July 29, 1884.

Application filed May 4, 1882. (Specimens.) Patented in Italy March 7, 1882, No. 439; in France March 23, 1882, No. 147,924; in Belgium March 31, 1882, No. 57,380; in England April 20, 1882, No. 1,895; in Austria July 10, 1882, No. 13,244; in Spain April 28, 1883, No. 3,869, and in Germany July 27, 1883, No. 23,344.

*To all whom it may concern:*

Be it known that I, ALESSANDRO CRUTO, a subject of the King of Italy, residing at Piossasco, Province of Turin, in the Kingdom of Italy, have invented new and useful Improvements in the Art of Electric Lighting by Means of Incandescent Lamps, of which the following is a specification.

My invention relates to improvements in processes of and apparatus for producing carbons for incandescent lamps and other purposes, as hereinafter fully described, and specifically pointed out in the claims.

When hydrogen carburets or carbon chlorurets are brought in contact with a body having a smooth surface and heated to such a degree as to decompose the carbon compounds, carbon strips, or sheets, or films, or tubes can be obtained of greater or less thickness that, owing to their high-resisting power to the action of heat as well as to the action of chemical agents, and their hardness and beauty, are admirably adapted not only for use as conductors of electricity in incandescent lamps, but also for other purposes—as, for example, in the ornamentation of jewelry and other like purposes.

In carrying out my method of producing these carbon tubes, films, or sheets, I pass carbureted hydrogen, or such other carbon compounds as are usually employed for this purpose, over and in contact with substances or bodies the surfaces of which are very smooth or polished, and which are preferably formed in part or in whole of aluminous or alkaline silicates. These surfaces I heat to such a degree as to decompose the carbon compound and cause it to be deposited upon said surfaces, from which the film or tube or sheet may be readily removed when of the desired thickness.

If it is desired to obtain very small carbon tubes—such as may be employed as conductors in incandescent electric lamps—the carbon deposit may be made upon a fine metallic wire—for instance, platinum wire—by heating the same to the temperature required to decompose the carbon compound, and, when a film of carbon has been deposited, to increase the heat to such a degree as to burn out the wire, which may be effected by an electric current, the intensity of which is then reduced until the tube is of the required thickness. In this manner I am enabled to obtain carbon conductors in sheets or tubes of almost any desired thickness by varying the duration of the operation. I have found that the best results are obtained when the silicate surface upon which the deposit is to be made, whether plane or cylindrical in cross-section—such as plates, tubes, or wires—are placed in a vertical or slightly-inclined position.

Any suitable apparatus may be employed to carry out my invention. I have, however, invented an apparatus that has given excellent results, and in the accompanying drawings I have shown the same, in Figure 1, by a vertical longitudinal section; and Fig. 2 is a slight modification in the construction thereof.

Like letters of reference are employed to indicate like parts in the above-described figures of drawings.

In Fig. 1, T indicates a tube, of porcelain, varnished interiorly, which passes vertically through a furnace, F, in such manner as to be heated at its central portion only, as shown. This tube is closed at one end with a rubber or analogous suitable stopper, S, through which passes the pipe P, that serves to conduct the gas or vapor to the tube. The upper part, $t$, of the tube is made of metal, and is united to said tube by means of a rubber tube, $t'$. An opening at the upper end of tube T, closed by a glass lens, L, permits the inspection and regulation of the progress of the formation of the films within the tube T. The carbon compound, preferably carbureted hydrogen, during its passage through tube T, is heated to the required temperature and decomposed, the carbon being deposited upon the walls of the tube, while the remaining gas or gases continue to rise and escape through pipe P' at the upper end of tube T, through which such gases are slowly exhausted.

In Fig. 2 I have shown a slight modification of construction of this apparatus, in which a tube, T, of any suitable material, and capable of resisting the temperature necessary to the process, passes vertically through a fire-clay muffle, M, in the furnace F. Within this tube are held, by slight frictional contact, small porcelain tubes or cylinders, C, upon the inner walls of which the carbon film is deposited, as first above described. The interior surface of these cylinders may be cylindrical or polygonal in cross-section.

The carbon fillets may be obtained in the desired form and dimensions, either directly or by cutting them from larger fillets. To produce them directly in the desired form and dimension, the said form is traced upon the porcelain by removing the varnish as soon as possible after its application to the tube T or cylinders C—that is to say, before the vitrification of the silicate varnish. The best results, however, are obtained by the use of tubes having plane polished surfaces, for which purpose they should be turned smooth and polished if cylindrical in cross-section, or ground and polished if of another shape in cross-section, before coating the same with the silicate, which should be applied so as to produce a perfectly smooth, polished surface. In this manner films or sheets of any desired width and length may be obtained, and from which the films may then be cut in a manner similar to the operation of cutting gold-leaf, by placing the same upon a cushion and cutting them out with a gilder or other suitable knife. Inasmuch as these films are very flexible, it is preferable to form them straight and bend them into the required or usual U shape in applying them to the lamp, which may be readily done.

To obtain carbon in the form of threads, a fine wire, preferably platinum wire, is coated with a silicate of the kind referred to, by dipping it repeatedly into a saturated solution of such silicate—for instance, in a saturated solution of silicate of potassa—from which the water may be evaporated by means of an electric current. The coated wire or wires are then passed into a glass tube, through which the carbon compound is passed, the wire or wires being heated by means of an electric current, so as to decompose the carbon compound, and the carbon thereof will be deposited upon the wire or wires in a compact and shining layer like the fillets or films heretofore described. If very fine wires, approximating the platinum or so-called "Wollaston" wires, are employed, they may be left within the carbon shell formed thereon without inconvenience or detrimental results. If the wire employed is a platinum wire, it should first be coated with some heavy carburet; otherwise the platinum will combine with the silicate. This coating may readily be effected by placing the platinum wire in carbureted hydrogen, and then heating it to a nearly-red heat by means of an electric current. The carbons, whether in the form of films or threads, have their extremities preferably of an increased diameter, which may be effected by a metallic deposit obtained by any of the usual methods of electroplating, or by dipping said extremities into a mixture of tar and asphalt with silicate of potassa, and decomposing the compound by a moderate increase of heat. In the production of carbon films of cylindrical form in cross-section, I prefer, however, to remove the wire from the carbon sheath, and this may be effected as follows: At the start of the operation, I so regulate the intensity of the electric current as to produce sufficient heat to decompose the carbon compound and cause the carbon to be deposited upon the wire. When a film of sufficient thickness has been deposited upon the wire, I increase the intensity of the current to produce sufficient heat to destroy the wire. This may be readily ascertained by the deflagration, which usually commences at one point of the wire, and soon extends over its entire length. When this deflagration ceases, the wire is consumed, and the intensity of the current should then be reduced to the decomposing-heat, and the deposit of carbon is or may be continued until the tube so formed is of the desired diameter.

In the production of carbons of increased thickness—such as may be used for ornamentation of jewelry or other ornamental purposes—I prefer to increase the properties of the porcelain tubes to fix the carbon. This may be readily done by passing pure hydrogen gas through the tubes before and during the heating of the same. I have not as yet been able to ascertain the action of the pure hydrogen upon the silicated surface, whether chemical or otherwise, that imparts to such surfaces a greater affinity for the carbon. It may be due to the action of the hydrogen upon the metallic oxides contained in the coating of the depositing-surfaces that imparts this increased affinity for carbon thereto. These porcelain tubes lose this property of fixing the carbon in a thick layer after each operation of depositing. They can, however, be restored by a deposit of a metallic film, which may be effected by any of the well-known processes.

I claim—

1. The herein-described method of producing carbon threads, which consists in first coating wire with carbon, then with an aluminous or alkaline silicate, and, finally, heating the coated wire in the presence of carbon compounds until an additional coating is laid on, as described.

2. The combination, with the furnace F, of the tubes T $t$ and pipes P P', said tube $t$ being provided at its upper end with a glass lens, as and for the purposes specified.

3. An apparatus for producing carbons for electric lamps and other purposes which consists of a suitable furnace, F, tubes T $t$, and pipes P P', in combination with a series of removable short cylinders for receiving the deposit of carbon, substantially as and for the purposes specified.

In witness that I claim the foregoing I have hereunto set my hand this 1st day of March, 1882.

ALESSANDRO CRUTO.

Witnesses:
ENRICO ENGEL,
G. GOLLETTI GUISEPPE.